US012747705B2

(12) United States Patent
Subramaniyan et al.

(10) Patent No.: US 12,747,705 B2
(45) Date of Patent: Sep. 29, 2026

(54) FLUID INJECTION SYSTEM AND METHOD FOR MITIGATING ROTATING STALL IN TURBINE ENGINE

(71) Applicant: GE Infrastructure Technology LLC, Greenville, SC (US)

(72) Inventors: Moorthi Subramaniyan, Bangalore (IN); Gunnar Leif Dan Siden, Greenville, SC (US)

(73) Assignee: GE Vernova Infrastructure Technology LLC, Greenville, SC (US)

(*) Notice: Subject to any disclaimer, the term of this patent is extended or adjusted under 35 U.S.C. 154(b) by 66 days.

(21) Appl. No.: 19/248,275

(22) Filed: Jun. 24, 2025

(65) Prior Publication Data

US 2025/0320835 A1 Oct. 16, 2025

Related U.S. Application Data

(63) Continuation of application No. 18/394,813, filed on Dec. 22, 2023, now Pat. No. 12,338,776.

(51) Int. Cl.
*F01D 9/06* (2006.01)
*F02C 3/06* (2006.01)
*F02C 9/18* (2006.01)

(52) U.S. Cl.
CPC .................. *F02C 9/18* (2013.01); *F01D 9/06* (2013.01); *F02C 3/06* (2013.01)

(58) Field of Classification Search
CPC ...... F01D 25/14; F01D 25/308; F01D 25/305; F01D 9/06; F01D 9/065; F02C 7/141; F02C 7/18; F02C 7/185
See application file for complete search history.

(56) References Cited

U.S. PATENT DOCUMENTS 2,674,845 A * 4/1954 Pouchot .................... F23R 3/18 60/761
3,631,672 A 1/1972 Gentile et al.
(Continued)

FOREIGN PATENT DOCUMENTS

DE 102012100373 A1 7/2012
EP 2613041 A2 7/2013
(Continued)

OTHER PUBLICATIONS

Philipp Doll et al.; Influence of a Rib in the Diffuser of a Low-Pressure Steam Turbine on Aerodynamic Excitation at Part Load Operation; Institute of Thermal Turbomachinery and Machinery Laboratory, University of Stuttgart, Stuttgart, Germany, Siemens Energy Global GmbH & Co. KG, Steam Turbines R&D, Mulheim an der Ruhr, Germany; Proceeding of the ASME Turbo Expo 2023; Turbomachinery Technical Conference & Exposition GT2023; Jun. 26-30, Boston, MA; 10 pages.
(Continued)

*Primary Examiner* — Thuyhang N Nguyen
(74) *Attorney, Agent, or Firm* — Fletcher Yoder, P.C.

(57) ABSTRACT

A system includes a turbine exhaust section downstream of a turbine. The turbine exhaust section includes an exhaust flow path. The turbine exhaust section also includes an inner wall radially disposed along the exhaust flow path. The turbine exhaust section also includes an outer wall disposed radially outward of the inner wall and along the exhaust flow path. The system also includes a fluid injection system configured to inject a fluid into a chamber radially disposed between the inner wall and the outer wall via a plurality of inner ports disposed in the inner wall. The plurality of inner ports is disposed downstream of a downstream edge of a last stage blade of the turbine.

20 Claims, 8 Drawing Sheets

(56) References Cited

U.S. PATENT DOCUMENTS

| | | | | |
|---|---|---|---|---|
| 4,157,010 | A * | 6/1979 | Sailer | F02C 3/10 60/774 |
| 4,579,507 | A | 4/1986 | Corrigan et al. | |
| 4,989,406 | A | 2/1991 | Vdoviak et al. | |
| 5,813,828 | A | 9/1998 | Norris | |
| 6,385,958 | B2 | 5/2002 | Leone et al. | |
| 6,393,825 | B1 | 5/2002 | Leone et al. | |
| 6,851,264 | B2 | 2/2005 | Kirtley | |
| 6,997,676 | B2 | 2/2006 | Koshoffer | |
| 7,143,573 | B2 | 12/2006 | Hoffmann et al. | |
| 7,493,769 | B2 | 2/2009 | Jangili | |
| 8,061,971 | B2 | 11/2011 | Roush et al. | |
| 8,313,286 | B2 | 11/2012 | Beeck | |
| 8,641,362 | B1 * | 2/2014 | Liang | F01D 9/065 415/115 |
| 9,032,721 | B2 | 5/2015 | Orosa et al. | |
| 9,062,559 | B2 | 6/2015 | Little | |
| 9,297,390 | B2 | 3/2016 | Broker et al. | |
| 9,546,567 | B2 | 1/2017 | Kasibhotla et al. | |
| 10,422,249 | B2 | 9/2019 | Takeda et al. | |
| 10,883,387 | B2 * | 1/2021 | Zhang | F02C 7/141 |
| 11,879,343 | B2 | 1/2024 | Hall et al. | |
| 2004/0079084 | A1 * | 4/2004 | Kirtley | F01D 25/305 60/774 |
| 2008/0063516 | A1 | 3/2008 | Fridsma | |
| 2009/0056342 | A1 | 3/2009 | Kirzhner | |
| 2009/0263243 | A1 * | 10/2009 | Little | F01D 25/14 415/216.1 |
| 2010/0175387 | A1 | 7/2010 | Foust et al. | |
| 2010/0251727 | A1 | 10/2010 | Myers et al. | |
| 2011/0058939 | A1 | 3/2011 | Orosa et al. | |
| 2012/0186261 | A1 * | 7/2012 | Toprani | F01D 25/30 60/39.5 |
| 2013/0149107 | A1 | 6/2013 | Munshi et al. | |
| 2013/0174534 | A1 | 7/2013 | Pushkaran et al. | |
| 2013/0224006 | A1 | 8/2013 | Saeki et al. | |
| 2013/0280050 | A1 | 10/2013 | Ansari et al. | |
| 2014/0123659 | A1 | 5/2014 | Biyani et al. | |
| 2014/0314549 | A1 | 10/2014 | Pakkala et al. | |
| 2014/0373504 | A1 | 12/2014 | Broker et al. | |
| 2015/0010382 | A1 | 1/2015 | Subramaniyan et al. | |
| 2015/0118015 | A1 | 4/2015 | Matys | |
| 2015/0132101 | A1 | 5/2015 | Marsh et al. | |
| 2015/0354382 | A1 | 12/2015 | Pakkala et al. | |
| 2017/0051679 | A1 * | 2/2017 | Becker, Jr. | F02C 9/18 |
| 2017/0167305 | A1 | 6/2017 | Scipio et al. | |
| 2017/0167377 | A1 | 6/2017 | Klosinski et al. | |
| 2018/0149085 | A1 | 5/2018 | Chennoju et al. | |
| 2018/0216527 | A1 | 8/2018 | D'Angelo et al. | |
| 2019/0257246 | A1 | 8/2019 | Higgins | |

FOREIGN PATENT DOCUMENTS

| | | | |
|---|---|---|---|
| EP | 3091196 | A1 | 11/2016 |
| WO | 2019027661 | A1 | 2/2019 |

OTHER PUBLICATIONS

European extended Search Report for EP Application No. 24215873.1 dated May 13, 2025; 9 pgs.

* cited by examiner

FLUID INJECTION SYSTEM AND METHOD FOR MITIGATING ROTATING STALL IN TURBINE ENGINE

CROSS-REFERENCE TO RELATED APPLICATION

This application is a continuation of U.S. application Ser. No. 18/394,813 entitled "FLUID INJECTION SYSTEM AND METHOD FOR MITIGATING ROTATING STALL IN TURBINE ENGINE" filed on Dec. 22, 2023, which is herein incorporated by reference in its entirety.

BACKGROUND

The subject matter disclosed herein relates to mitigation of rotating stall formation in a low-pressure turbine section of a turbine engine.

A gas turbine engine may operate in various conditions, such as a steady state condition, a transient condition (e.g., startup or shutdown), a full load condition, or a part load condition. Unfortunately, when operating in a low flow operating condition (e.g., transient or part load conditions), the gas turbine engine may be susceptible to a rotating stall condition. The rotating stall condition involves the formation of rotating stall cells in the low-pressure turbine section of the gas turbine engine, leading to a reversed flow. The rotating stall cells rotate at a fraction of a rotational speed of the gas turbine engine (e.g., low frequency), thereby causing an asynchronous high cycle fatigue on turbine blades in the low-pressure turbine section. Accordingly, a need exists for at least mitigating or preventing the rotating stall condition in gas turbine engines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a turbine exhaust section downstream of a turbine. The turbine exhaust section includes an exhaust flow path. The turbine exhaust section also includes an inner wall radially disposed along the exhaust flow path. The turbine exhaust section also includes an outer wall disposed radially outward of the inner wall and along the exhaust flow path. The system also includes a fluid injection system configured to inject a fluid into a chamber radially disposed between the inner wall and the outer wall via a plurality of inner ports disposed in the inner wall. The plurality of inner ports is disposed downstream of a downstream edge of a last stage blade of the turbine.

In another embodiment, a system includes a turbine exhaust section. The turbine exhaust section includes an exhaust flow path, an inner wall radially disposed along the exhaust flow path, and an outer wall disposed radially outward of the inner wall and along the exhaust flow path, and a strut radially extending from the inner wall to the outer wall. The system also includes a fluid injection system configured to inject a fluid into a chamber radially disposed between the inner wall and the outer wall via a plurality of ports disposed in a front end portion of the strut. The plurality of ports is disposed downstream of a downstream edge of a last turbine blade of a turbine.

In another embodiment, a system includes a turbine exhaust section downstream of a turbine. The turbine exhaust section includes an exhaust flow path, an inner wall radially disposed along the exhaust flow path, and an outer wall disposed radially outward of the inner wall and along the exhaust flow path. The system also includes a fluid injection system. The fluid injection system includes a fluid supply configured to supply one or more fluids to the turbine exhaust section. The fluid injection system also includes a controller having a processor, a memory, and instructions stored on the memory and executable by the processor to control injection of the one or more fluids into a chamber radially disposed between the inner wall and the outer wall via a plurality of inner ports integrally formed in the inner wall. The plurality of inner ports is disposed downstream of a downstream edge of a last stage blade of the turbine.

BRIEF DESCRIPTION OF THE DRAWINGS

These and other features, aspects, and advantages of the present system and method will become better understood when the following detailed description is read with reference to the accompanying drawings in which like characters represent like parts throughout the drawings, wherein.

DETAILED DESCRIPTION

Figure 1:
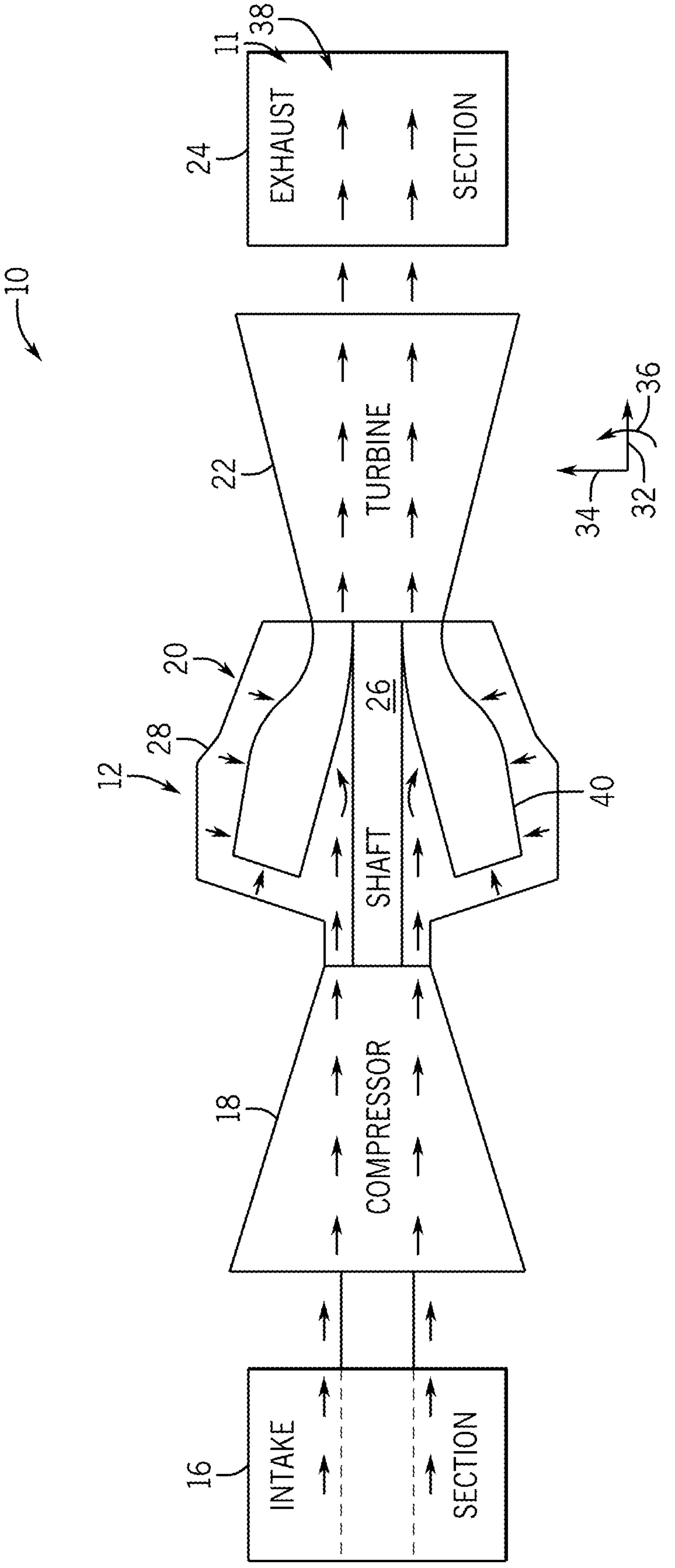
FIG. 1 is a schematic flow diagram of an embodiment of a turbine system having a gas turbine engine with a stall mitigation system having a fluid injection system.

One or more specific embodiments of the present system and method will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, where range limitations may be combined and/or interchanged, such ranges are identified and include all the sub-ranges contained therein unless context or language indicates otherwise. "Substantially" as applied to a particular value may indicate +/−10% of the stated value(s) and, when used in the context of an angle, may indicate +/−10 degrees greater or less than the stated angle or direction. For example, "generally vertical" includes directions within ten degrees of vertical in any direction, e.g., clockwise or counter-clockwise. For example, "substantially perpendicular" axes or features include axes or elements that intersect at angles between 80 degrees and 100 degrees and thus should be interpreted more broadly than the unmodified term "perpendicular," which is defined as a 90-degree intersection between axes or elements.

As described in greater detail below, the disclosed embodiments include a stall mitigation system configured to enable a mitigation of a rotating stall condition in a low-pressure turbine section of a turbine (e.g., gas turbine engine or steam turbine) via mitigating formation of rotating stall cells and a reversed flow downstream of the last stage blades of the turbine. For example, certain embodiments of the stall mitigation system include a fluid injection system configured to inject a fluid into a hub chamber downstream of a last stage blade of a turbine via a fluid injection system. In certain embodiments, the fluid injection system may include fluid injection ports disposed on an inner wall (e.g., inner annular wall) of the turbine and downstream of the last stage blade. Additionally, or alternatively, the fluid injection system may include fluid injection ports disposed on an outer wall (e.g., outer annular wall) of the turbine and downstream of the last stage blade. In certain embodiments, the fluid injection ports may be circumferentially angled in a direction opposite of a direction of rotation of rotating stall cells.

In certain embodiments, the stall mitigation system includes a fluid extraction system having an ejector configured to extract or evacuate exhaust gas from the chamber from ports in the outer wall, the inner wall, or any suitable location to help mitigate or prevent the rotating stall condition.

In certain embodiments, the fluid injection system may include fluid injection ports integrally disposed in an upstream portion of a diffuser strut in the exhaust section of the turbine. The fluid injection ports may be disposed on an inner radial portion of the upstream portion of the diffuser strut and, in certain embodiments, may be angled in the direction opposite of the direction of rotation of the rotating stall cells. Additionally, or alternatively, the fluid injection system may include auxiliary fluid injection ports integrally disposed in an upstream portion of an auxiliary diffuser strut in the exhaust section of the gas turbine engine. The auxiliary diffuser struts may be axially aligned with the diffuser struts and circumferentially offset from the diffuser struts. The auxiliary fluid injection ports may be disposed on an inner radial portion of the upstream portion of the auxiliary diffuser strut and, in certain embodiments, may be angled in the direction opposite of the direction of rotation of the rotating stall cells.

FIG. 1 is a schematic flow diagram of an embodiment of a turbine system 10 having a gas turbine engine 12 with a stall mitigation system 11 configurated to reduce a rotating stall condition. As discussed in further detail below, the stall mitigation system 11 includes a fluid injection system 38 configured to inject a fluid (e.g., compressor bleed air, exhaust gas, carbon dioxide, etc.) into areas experiencing reversed flow (e.g., flow recirculation, vortex formation, etc.), thereby helping to reduce the reversed flow and/or to inhibit a rotating stall condition. In certain embodiments, the turbine system 10 may include an aircraft, a locomotive, a power generation system, or combinations thereof, although a power generation system is illustrated herein. The illustrated gas turbine engine 12 includes an air intake section 16, a compressor or compressor section 18, a combustor or combustor section 20, a turbine or turbine section 22 (e.g., an expansion turbine), and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 40, where the compressed air may mix and combust with fuel within the combustors 40 to drive the turbine 22. From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. The exhaust section 24 may include a plurality of struts, including main support struts and auxiliary struts, downstream from the turbine 22, such as in a diffuser section of the exhaust section 24. The gas turbine engine 12 may be described in terms of a longitudinal direction or axis 32 (e.g., axial direction), a radial direction or axis 34, and a circumferential direction or axis 36.

As discussed in further detail below, the fluid injection system 38 of the stall mitigation system 11 may include fluid injectors or injection ports in the turbine 22 and/or exhaust section 24 at a plurality of axial positions relative to the longitudinal direction 32, a plurality of radial positions relative to the radial direction 34, and/or a plurality of circumferential positions relative to the circumferential direction 36. For example, the fluid injectors or injection ports of the fluid injection system 38 may be disposed in one or more downstream or low-pressure turbine stages (e.g., last turbine stage) of the turbine 22, axially between the last turbine stage of the turbine 22 and the plurality of struts, directly on the plurality of struts, and/or circumferentially between the plurality of struts.

Additionally, the fluid injection through the fluid injectors or injection ports may be selectively controlled based on operating conditions of the turbine system 10. For example, during operating conditions conducive to flow reversal and a rotating stall condition (e.g., a low flow condition associated with a part load or transient condition of the turbine system 10), the fluid injection system 38 may be controlled to provide fluid injection to oppose or inhibit the flow reversal, and thus reduce the possibility of the rotating stall condition. However, during normal operating conditions (e.g., full load and/or steady state operating conditions), the fluid injection system 38 may be controlled to reduce or stop fluid injection.

Figure 2:
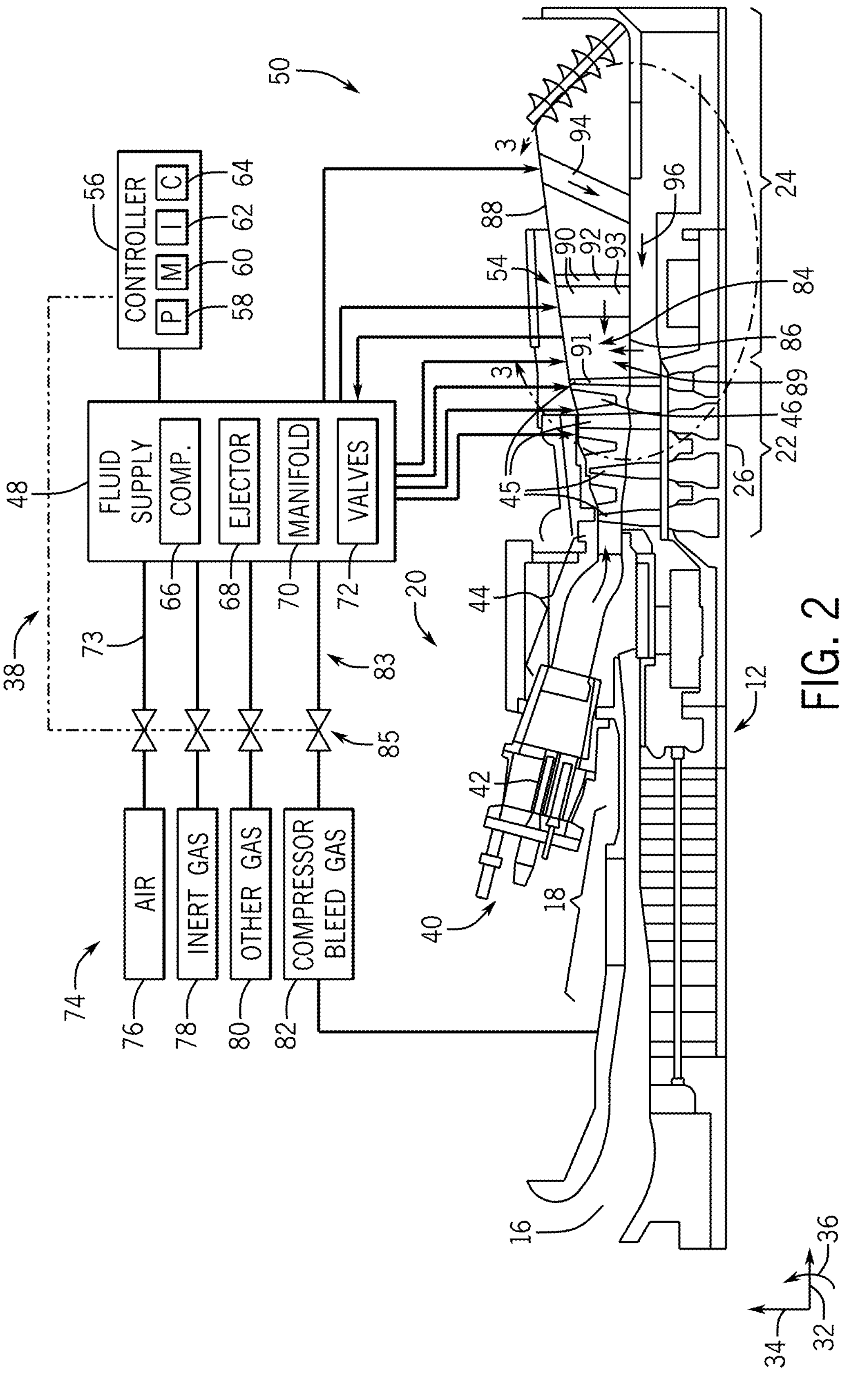
FIG. 2 is a cross-sectional side view of an embodiment of the gas turbine engine of FIG. 1 sectioned through the longitudinal axis, illustrating an embodiment of the fluid injection system of the stall mitigation system.

FIG. 2 is a cross-sectional side view of an embodiment of the gas turbine engine 12 of FIG. 1 sectioned through the longitudinal axis 32, illustrating an embodiment of the fluid injection system 38 coupled to the turbine 22 and the exhaust section 24. As described above with respect to FIG. 1, air may enter the gas turbine engine 12 through the air intake section 16 and may be compressed by the compressor 18. The compressed air from the compressor 18 may then be directed into the combustor section 20 where the compressed air may be mixed with fuel. The combustor section 20 includes one or more combustors 40. In certain embodiments, the gas turbine engine 12 may include multiple combustors 40 disposed in an annular arrangement. Alternately, the combustor section 20 may include an annular combustor (not shown). Further, each combustor section 20 may include multiple fuel nozzles 42 attached to or near a head end of each combustor section 20 in an annular or other arrangement.

In operation, the fuel nozzles 42 may inject a fuel-air mixture into the combustors 40 in a suitable ratio for optimal combustion, emissions, fuel consumption, and power output. Within the combustor section 20, the fuel-air mixture may combust to generate hot, pressurized combustion gases. After combustion, the hot pressurized combustion gases may exit the combustor section 20 and flow through a transition piece 44 to the turbine 22. Within the turbine 22, the pressurized combustion gases may turn blades 45 that extend radially within the turbine 22 and that are disposed between stationary vanes 46 to rotate the shaft 26 before exiting through the exhaust section 24 as exhaust gas.

In the illustrated embodiment, the fluid injection system 38 includes a fluid supply 48, fluid lines 50 (e.g., conduits, pipes, or tubing), fluid injectors or injection ports 54, and a controller 56. In certain embodiments, the controller 56 may include a processor 58, a memory 60, instructions 62 stored on the memory 60 and executable by the processor 58, and communication circuitry 64 configured to communicate with the fluid supply 48 and various sensors distributed throughout the turbine system 10. In the illustrated embodiment, the fluid supply 48 includes a compressor 66, an ejector 68, a manifold 70, and valves 72. As shown, the fluid supply 48 is configured to intake a fluid 73 (e.g., gas) from one or more fluid sources 74. The fluid sources 74 may include tanks, containers, equipment having the fluids in the turbine system 10, air separation units (ASUs), pipelines, or connections with other portions of the turbine system 10 (e.g., compressor 18). The ASU may be configured to separate air into oxygen and nitrogen for use in the turbine system 10. The fluid sources 74 may include air 76, an inert gas 78, other gases 80, compressor bleed gas 82 from the compressor 18 of the gas turbine engine 12, or a combination thereof. For example, the inert gas 78 may include the nitrogen from the ASU or another source, or another inert gas. The other gas 80 may include exhaust gas extracted from the exhaust section 24, carbon dioxide captured in a carbon capture system, or another gas. The compressor bleed gas 82 may include compressed air or compressed exhaust gas recirculation (EGR) gas, wherein the EGR gas is recirculated from the exhaust section 24 into the compressor 18 as part of an EGR system.

The fluid supply 48 is configured to receive fluid from one or more of the fluid sources 74 via a plurality of fluid lines 83 having respective valves 85, which are coupled to and controlled by the controller 56. Accordingly, the controller 56 is configured to selectively control the valves 85 and the fluid supply 48 to control the fluid supply from the fluid sources 74 to the various injectors or injection ports 54. For example, the controller 56 may selectively open and close the various valves 85 to provide only one or a combination of the fluids from the fluid sources 74 (e.g., air, inert gas, other gas, compressor bleed gas, or any combination thereof) to the various injectors or injection ports 54. The compressor 66 of the fluid supply 48 may be configured to compress and/or boost a pressure of any one or more of the fluid sources 74. The ejector 68 may operate using high-pressure and low-pressure gases associated with a venturi section 69 (FIG. 3), such that the fluid injection system 38 can extract and/or inject fluids using the fluid lines 50 and the injection ports 54. Thus, in certain embodiments, the injection ports 54 may be used as injection ports or extraction ports, and the fluid lines 50 may be used as injection lines or extraction lines. Various details of the ejector 68 are discussed below.

The manifold 70 may include a fluid injection manifold configured to distribute the various fluids from the fluid source 74 to the injectors or injection ports 54. In certain embodiments, the manifold 70 may further include a fluid extraction manifold coupled to the ejector 68 and one or more sets of ports 54 (e.g., extraction ports). The valves 72 also may be coupled to the fluid lines 50 and the manifold(s) 70 to help control the distribution of fluids through the fluid injection system 38 to the injectors or injection ports 54.

In the illustrated embodiment, the exhaust section 24 includes an exhaust flow path 84 (e.g., annular exhaust flow path), an inner wall 86 (e.g., inner annular wall, inner exhaust wall) radially disposed along the exhaust flow path 84, and an outer wall 88 (e.g., outer annular wall, outer exhaust wall) disposed radially outward of the inner wall 86 and along the exhaust flow path 84. The inner and outer walls 86 and 88 also may define an exhaust diffuser (or exhaust diffuser section) of the exhaust section 24, wherein the exhaust diffuser expands in cross-sectional area to help lower an exhaust pressure and diffuse the exhaust flow. The exhaust section 24 also includes a chamber 89 (e.g., annular chamber, annular exhaust chamber) radially disposed between the inner wall 86 and the outer wall 88 and axially disposed downstream of a last stage blade 91 (or set of last stage blades) of the turbine 22.

In certain embodiments, the exhaust section 24 also includes one or more struts 90 (e.g., diffuser strut in exhaust diffuser section). The struts 90 may include main struts 92 (e.g., main structural support struts) and/or auxiliary struts 93. In the illustrated embodiment, the main struts 92 and the auxiliary struts 93 extend in the radial direction 34 from the inner wall 86 to the outer wall 88. In certain embodiments, the main struts 92 and/or the auxiliary struts 93 may extend only partially or completely between the inner wall 86 and the outer wall 88. For example, the main strut 92 may extend completely between the inner and outer walls 86 and 88, whereas the auxiliary strut 93 may extend only partially (but not completely) between the inner and outer walls 86 and 88. Although the following discussion may refer only to a strut 90 (e.g., 92, 93), the disclosed features of the fluid injection system 38 are intended to apply to any number of struts 90, such as at least equal to or greater than 1, 2, 3, 4, 5, 6, 7, 8, 9, 10, 15, 20, or more struts 92 and 93. In the illustrated embodiment, the exhaust section 24 includes a manway 94 (e.g., a hollow radial manway structure enabling user access) fluidly coupled to a channel 96 disposed in the inner wall 86. The channel 96 is fluidly coupled to the chamber 89.

The fluid injection system 38 is configured to inject the fluid 73 into the chamber 89 via the fluid injection ports 54, as described in more detail herein. As discussed in further detail below, the injectors or injection ports 54 may include one or more sets of injection ports disposed in the inner wall 86, the outer wall 88, the struts 90 (e.g., 92, 93), or any combination thereof. For example, the injectors or injection ports 54 may include one or more sets of injection ports 54 in a circumferential arrangement in the circumferential direction 36 about the longitudinal axis 34, wherein each set of the injection ports 54 is disposed at a different axial position along the longitudinal axis 34 (e.g., first set at a first axial position, second set at a second axial position, etc.). By further example, the foregoing sets of injection ports 54 may be disposed on the inner wall 86 and/or the outer wall 88 in downstream or low-pressure turbine stages (e.g., last turbine stage) of the turbine 22, in the exhaust section 24 between the last turbine stage and the struts 90, on the struts 90, circumferentially between the struts 90, or any combination thereof. Accordingly, the injection ports 54 may be disposed at differential radial positions, such as an inner radius along the inner wall 86, an outer radius along the outer wall 88, or one or more intermediate radial positions along the struts 90 between the inner and outer walls 86 and 88.

In some embodiments, each strut 90 may include any number of the injection ports 54 (e.g., at least 1, 2, 3, 4, 5, 6, 7, 8, 9, 10 or more) uniformly or non-uniformly distributed in the radial direction 34 between the inner and outer walls 86 and 88. In some embodiments, the injection ports 54 may be angled acutely or perpendicularly relative to the surface or wall (e.g., inner wall 86, outer wall 88, or wall of the strut 90). For example, the angle of the injection ports 54 may be less than, equal to, or greater than 5, 10, 15, 20, 25, 30, 35, 40, 45, 50, 55, 60, 65, 70, 75, 80, 85, or 90 degrees, plus or minus 5 degrees, relative to the adjacent surface or wall. The injection ports 54 may be directed in an upstream direction, a downstream direction, and/or a crosswise direction, relative to a downstream direction of exhaust flow through the turbine 22 and the exhaust section 24. For example, the positions, angles, and directions of the injectors or injection ports 54 may be selected to oppose, inhibit, or interrupt a reversed flow (or recirculation) of the exhaust gas, particularly associated with large scale vortex structures in the flow, thereby helping to inhibit or prevent the formation of rotating stall cells in the turbine 22. Various aspects of the fluid injection system 38 are discussed below.

Additionally, the controller 56 is configured to control the fluid injection system 38 based on operational conditions of the turbine system 10 to help inhibit or prevent the formation of rotating stall cells in the turbine 22. For example, the controller 56 may selectively actuate or start the fluid injection by the fluid injection system 38 when the operating conditions of the turbine system 10 indicate a low flow condition or other conditions conducive to the formation of rotating stall cells (e.g., low flow conditions associated with a part load or transient condition (e.g., startup, shutdown, or other transient behavior) of the turbine system 10). In some embodiments, the controller 56 may receive sensor feedback from the turbine 22 and/or the exhaust section 24 indicating a low flow rate, a reversed flow, vibration, or other condition indicating of rotating stall. By further example, the controller 56 may selectively reduce flow, deactivate, or stop the fluid injection by the fluid injection system 38 when the operating conditions of the turbine system 10 indicate a normal flow condition or other conditions non-conducive to the formation of rotating stall cells (e.g., high or regular flow condition associated with a full load or steady stage condition of the turbine system 10). The controller 56 may selectively control fluid injection to and/or extraction from the various ports 54 depending on the severity of the operating conditions conducive to rotating stall.

Figure 3:
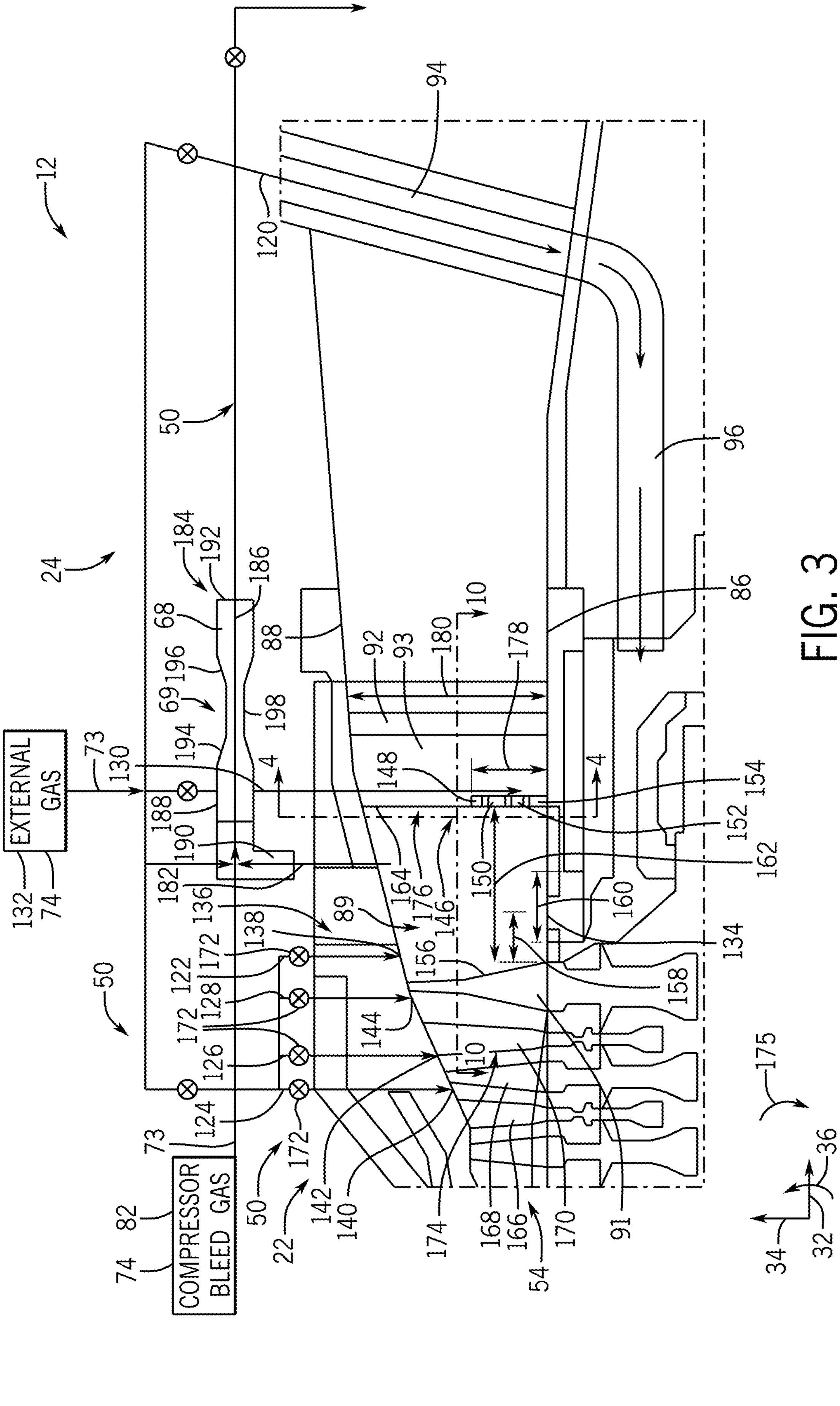
FIG. 3 is a cross-sectional side view of an embodiment of the gas turbine engine of FIG. 2 taken within line 3-3, illustrating fluid emission into the gas turbine engine by the fluid injection system of FIG. 2.

FIG. 3 is a cross-sectional side view of an embodiment of the gas turbine engine 12 of FIG. 2 taken within line 3-3, illustrating fluid injection into the turbine 22 and the exhaust section 24 by the fluid injection system 38 of FIG. 2. In the illustrated embodiment, the fluid injection system 38 includes fluid lines 50 (e.g., fluid lines 120, 122, 124, 126, 128, and 130) fluidly coupled to a plurality of fluid sources 74 (e.g., an external gas 132 and the compressor bleed gas 82). The fluid lines 50 may be fluid admission or supply lines, fluid extraction or withdrawal lines, or a combination thereof. Although the illustrated embodiment shows the external gas 132 and the compressor bleed gas 82, it should be recognized that a combination of one or more fluid sources 74 described herein may be coupled to the fluid injection system 38. Specifically, the external gas 132 may be air 76, an inert gas 78, or other gases 80, as discussed above with reference to FIG. 2. The fluid lines 50 are fluidly coupled to the fluid injection ports 54. The fluid injection ports 54 include inner ports 134, outer ports 136 (e.g., outer ports 138, 140, 142, and 144), and strut ports 146 (e.g., strut ports 148, 150, 152, and 154) disposed in the main strut 92, the auxiliary strut 93, or both.

In the illustrated embodiment, the fluid line 120 is fluidly coupled to the manway 94 of the exhaust section 24. The manway 94 is fluidly coupled to the channel 96 disposed in the inner wall 86. As shown, the channel 96 is fluidly coupled to the inner ports 134, which are integrally disposed in the inner wall 86. The inner ports 134 are disposed downstream (e.g., in the longitudinal direction 32) of a downstream edge 156 of the last stage blades 91 of the turbine 22 (e.g., downstream from last turbine stage). The inner ports 134 are configured to admit (e.g., inject) the fluid 73 into the chamber 89. The inner ports 134 also may be described as radially inner ports, inner radius ports, inner wall ports, or inner hub ports. The inner ports 134 may include one or more sets of a plurality of inner ports 134 spaced apart from one another in a circumferential arrangement about the longitudinal axis 32 at a common axial position, wherein each respective set of the plurality of inner ports 134 may be disposed at a different axial position. For example, each set of the plurality of inner ports 134 may include at least 10, 20, 30, 40, 50, 60, 70, 80, 90, 100, 200, 500 or more inner ports 134 uniformly or non-uniformly spaced in the circumferential arrangement. The inner ports 134 may be angled acutely or perpendicularly relative to the inner wall 86 and/or the longitudinal axis 32.

In the illustrated embodiment, the inner ports 134 are disposed at an axial distance 158 downstream of the downstream edge 156 of the last stage blades 91. As shown, the distance 158 falls in a range of axial distances 160 relative to an axial distance 162 (e.g., total distance or spacing) spanning in a downstream direction from the downstream edge 156 of the last stage blades 91 toward an upstream edge 164 of the struts 90 of the exhaust section 24. For example, when measured as a percentage of the axial distance 162 in the downstream direction from the downstream edge 156, the range of axial distances 160 may be approximately 5 to 95 percent, 10 to 90 percent, 15 to 85 percent, 20 to 80 percent, 25 to 75 percent, 30 to 70 percent, 35 to 65 percent, or 40 to 60 percent. In certain embodiments, a first set of the inner ports 134 (e.g., circumferential arrangement) may be disposed at a first axial distance 158, a second set of the inner ports 134 (e.g., circumferential arrangement) may be disposed at a second axial distance 158, a third set of the inner ports 134 (e.g., circumferential arrangement) may be disposed at a third axial distance 158, a fourth set of the inner ports 134 (e.g., circumferential arrangement) may be disposed at a fourth axial distance 158, and so forth. The different distances 158 may be incrementally spaced at uniform or non-uniform spacings from the downstream edge 156 of the last turbine blades 91. In operation, the admission of the fluid 73 via the inner ports 134 mitigates the formation of rotating stall cells (e.g., hub vortex originating stall cells) in the chamber 89 adjacent the turbine 22 (e.g., last turbine stage).

In the illustrated embodiment, the fluid admission line 122 is fluidly coupled to outer ports 138. As shown, the outer ports 138 are integrally disposed in the outer wall 88 and disposed downstream of the downstream edge 156 of the last stage blades 91. The outer ports 138 may include one or more sets of the outer ports 138 (e.g., circumferential arrangement) at one or more respective axial distances, such as axial distances from the downstream edge 156 of the last stage blades 91. Similar to the inner ports 134, the outer ports 138 may be spaced at one or more axial distances between the downstream edge 156 of the last stage blades 91 and the upstream edge 164 of the struts 90. In certain embodiments, the range of axial distances for the outer ports 138 may be the same as discussed above with reference to the inner ports 134. The outer ports 138 are configured to admit the fluid 73 into the chamber 89 from the outer wall 88. It should be recognized that the admission of the fluid 73 via the outer ports 138 mitigates the formation of rotating stalls (e.g., hub vortex stalls) in the chamber 89 downstream of the turbine 22.

In the illustrated embodiment, the fluid lines 124, 126, and 128 are fluidly coupled to the outer ports 140, 142, and 144, respectively. As shown, the outer port 140 is integrally disposed in the outer wall 88 and axially disposed between second-to-last stage vanes 166 of the turbine 22 and second-to-last stage blades 168 of the turbine 22. The outer ports 140 are configured to admit or inject fluid into a second-to-last torus chamber 174 axially disposed between the second-to-last stage vanes 166 and the second-to-last stage blades 168. Additionally, the outer ports 142 are integrally disposed in the outer wall 88 and axially disposed between the second-to-last stage blades 168 and last stage vanes 170 of the turbine 22. Additionally, the outer ports 144 are integrally disposed in the outer wall 88 and axially disposed between the last stage vanes 170 and the last stage blades 91. In the illustrated embodiment, each of the outer ports 136 are shown as being independently controllable via valves 172 (e.g., valves 72), such that any combination of the outer ports 138, 140, 142, or 144 may admit fluid into the turbine 22 and/or the exhaust section 24. It should be recognized that the admission of the fluid 73 via the outer ports 140, 142, and 144 mitigates the formation of rotating stalls (e.g., torus vortex stalls) in turbine chambers 174 (e.g., torus chambers) disposed between the blades 45 and the vanes 46 of the turbine 22. Furthermore, it should be recognized that the outer ports 136 may include any combination of the outer ports 138, 140, 142, and 144.

The outer ports 138, 140, 142, and 144 may be described as radially outer ports, outer radius ports, or outer wall ports. The outer ports 138, 140, 142, and 144 may include one or more sets of a plurality of outer ports spaced apart from one another in a circumferential arrangement about the longitudinal axis 32 at a common axial position, wherein each respective set of the plurality of outer ports may be disposed at a different axial position. For example, each set of the plurality of outer ports 138, 140, 142, and 144 may include at least 10, 20, 30, 40, 50, 60, 70, 80, 90, 100, 200, 500 or more outer ports uniformly or non-uniformly spaced in the circumferential arrangement. The outer ports 138, 140, 142, and 144 may be angled acutely or perpendicularly relative to the outer wall 88 and/or the longitudinal axis 32.

In the illustrated embodiment, the fluid line 130 is disposed inside the strut 90 (e.g., main strut 92, auxiliary strut 93) and is fluidly coupled to the strut ports 146. As shown, the strut ports 146 are integrally disposed in a front end portion 176 (e.g., upstream end portion) of the strut 90. The strut ports 146 are configured to admit the fluid 73 into the chamber 89 from the front end portion 176 of the strut 90. In the illustrated embodiment, the strut ports 146 are disposed radially below or within a radial height 178 (e.g., radius threshold or radial range) relative to the inner wall 86. In certain embodiments, the radial height 178 is less than half of a total height 180 (e.g., total radius or radial length) of the strut 90 extending from the inner wall 86 to the outer wall 88. The admission of the fluid 73 via the strut ports 146 mitigates the formation of rotating stalls (e.g., hub vortex stalls) in the chamber 89 downstream of the turbine 22. The strut ports 146 are described in further detail herein.

The fluid injection ports 54 may include any combination of the inner ports 134, the outer ports 136, and the strut ports 146. For example, in certain embodiments, the fluid injection system 38 may include the inner ports 134 and the strut ports 146, while the outer ports 136 are omitted. In certain embodiments, the controller 56 may be configured to independently control fluid flows to the inner ports 134, the outer ports 136, and the strut ports 146 concurrently and/or sequentially based on operating conditions. For the operating conditions may include an operational mode (e.g., steady state, full load, part load, or transient (e.g., startup, shutdown, etc.)) or sensor feedback (e.g., pressure, flow rate, flow velocity, flow direction, etc.). For example, the sensor feedback may be indicative of flow reversal and/or stall conditions.

In the illustrated embodiment, the ejector 68 is fluidly coupled to the chamber 89 via a fluid line 182 coupled to the outer wall 88. As noted above, the ejector 68 may operate using high-pressure and low-pressure gases associated with a venturi section 69, such that the fluid injection system 38 can extract and/or inject fluids. In the illustrated embodiment, the ejector 68 includes an annular body 184 along a central axis 186, wherein the annular body 184 includes an axial fluid inlet 188, a radial fluid inlet 190, an axial fluid outlet 192, and the venturi section 69 between the axial fluid inlet 188 and the axial fluid outlet 192. The venturi section 69 includes an annular converging wall portion or passage 194, an annular diverging wall portion or passage 196, and an annular throat 198 between the passages 194 and 196. The ejector 68 is configured to receive a high-pressure flow (e.g., motive fluid or driving fluid) through the axial fluid inlet 188 and a low-pressure flow (e.g., driven fluid or suctioned fluid) through the radial fluid inlet 190. In the illustrated embodiment, the high-pressure flow may be the compressor bleed gas 82; however, other high-pressure gases may be used with the ejector 68. The low-pressure flow may be the exhaust gas in one or more regions of the turbine 22 and/or the exhaust section 24 susceptible to stall conditions, such as between the last stage blades 91 and the struts 92 along the outer wall 88.

Accordingly, in the illustrated embodiment, the ejector 68 is configured to evacuate a portion of the exhaust gas from the chamber 89 between the turbine 22 and the exhaust section 24 by using the compressor bleed gas 82 as the high-pressure flow. For example, the compressor bleed gas 82 may be used in conjunction with the ejector 68 to create suction to draw the exhaust gas from the chamber 89. The ejector 68 also may output a fluid flow (e.g., mixture of the exhaust gas and compressor bleed flow) to another location in the exhaust section 24, such as downstream from the struts 90. In certain embodiments, the ejector 68 may be used to suction or remove exhaust gas in addition to and controlled independently of flow admission through the inner ports 134, the outer ports 136, and/or the strut ports 146, thereby helping to reduce or eliminate flow reversal and stall conditions.

Figure 4:
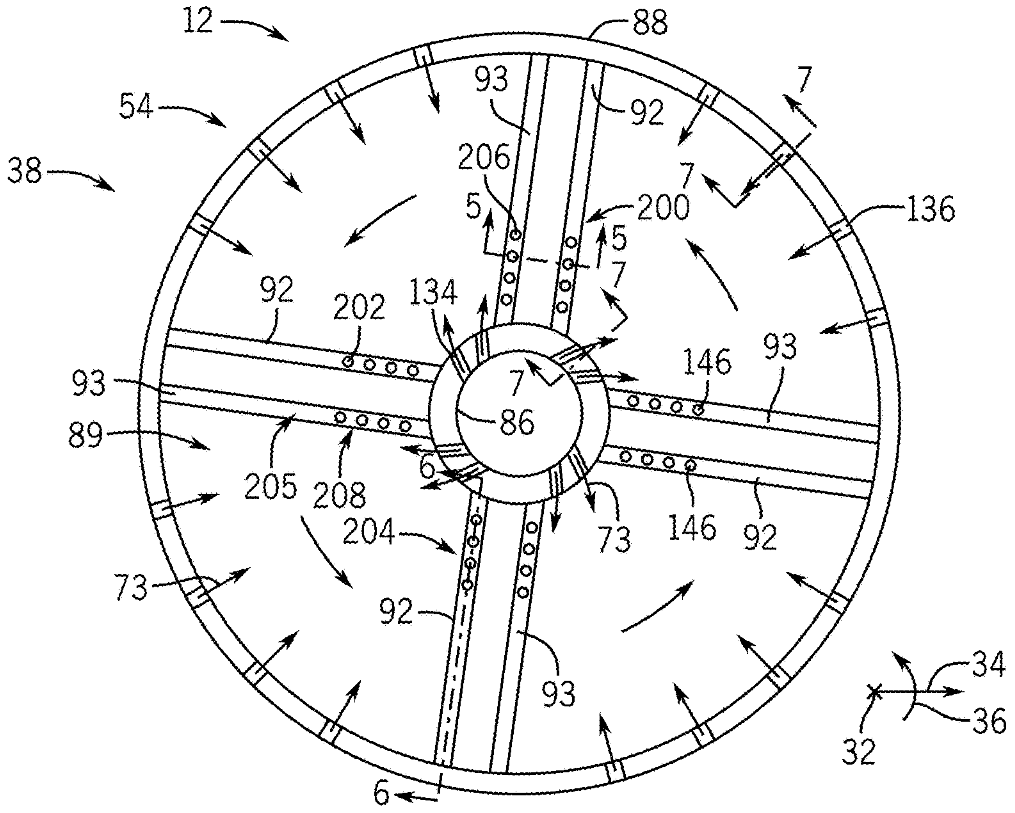
FIG. 4 is a cross-sectional view of an embodiment of the gas turbine engine of FIG. 3 taken along line 4-4 showing fluid injection ports disposed in upstream portions of a plurality of struts of the gas turbine engine, and also disposed in inner and outer walls of the gas turbine engine.

FIG. 4 is a cross-sectional view of an embodiment of the gas turbine engine 12 of FIG. 3 taken along line 4-4, showing fluid injection ports 54 disposed in upstream portions 200 (e.g., front end portions) of a plurality of main struts 92 of the gas turbine engine 12, and also disposed in the inner wall 86 and the outer wall 88 of the gas turbine engine 12. In the illustrated embodiment, the fluid injection system 38 includes the inner ports 134 disposed in the inner wall 86 (e.g., inner annular wall) and the outer ports 136 disposed in the outer wall 88 (e.g., outer annular wall). In some embodiments, the inner ports 134 are configured to admit the fluid 73 into the chamber 89 via injecting the fluid 73 radially outward (e.g., radially outward direction) through the inner ports 134. Additionally, or alternatively, the outer ports 136 are configured to admit the fluid 73 into the chamber 89 via injecting the fluid 73 radially inward (e.g., radially inward direction) through the outer ports 136. In the illustrated embodiment, the inner ports 134 are circumferentially angled in a direction opposite of the direction of rotation of the blades of the turbine (e.g., the direction of the rotating stall movement). For example, if the blades rotate in the circumferential direction 36 (e.g., counterclockwise as shown), then the inner ports 134 may be angled in the clockwise direction, or vice versa. In certain embodiments, the outer ports 136 may additionally be circumferentially angled in a direction opposite of the direction of rotation of the blades. The circumferential angling of the inner ports 134 is described in further detail herein.

In the illustrated embodiment, the fluid injection system 38 of the exhaust section 24 includes the strut ports 146 (e.g., main strut ports 202) integrally disposed in the upstream portions 200 of the main struts 92 (e.g., exhaust strut, diffuser strut). As shown, the fluid injection system 38 is configured to inject the fluid 73 into the chamber 89 via the main strut ports 202. As shown, the main struts 92 radially extend from the inner wall 86 to the outer wall 88. In the illustrated embodiment, the main struts 92 each include four main strut ports 202 disposed on an inner radial portion 204 of the upstream portion 200 (e.g., front end) of the main strut 92. In certain embodiments, the main struts 92 may include more or fewer than four main strut ports 202 (e.g., 1, 2, 3, 5, 6, 7, 8, 9, 10, or more). As discussed in further detail herein, the main strut ports 202 are angled relative to a longitudinal axis (e.g., radial axis) of the main struts 92. Although the illustrated embodiment shows each main strut 92 as having the same number of strut ports 146, the number of strut ports 146 may vary between the main struts 92.

In the illustrated embodiment, the fluid injection system 38 of the exhaust section 24 includes the strut ports 146 (e.g., auxiliary strut ports 206) integrally disposed in upstream portions 205 (e.g., front end portions) of the auxiliary struts 93 (e.g., auxiliary exhaust strut, auxiliary diffuser strut). As shown, the auxiliary struts 93 extend in the radial direction 34 from the inner wall 86 to the outer wall 88 of the gas turbine engine 12 and are circumferentially offset (e.g., spaced in circumferential direction 36) from the main struts 92. In certain embodiments, an auxiliary circumferential thickness 208 of the auxiliary struts 93 may be smaller than a circumferential thickness 210 of the main struts 92 in the circumferential direction 36. However, the auxiliary circumferential thickness 208 may be equal to or larger than the main strut circumferential thickness 210 in some embodiments.

As shown, the fluid injection system 38 is configured to inject the fluid 73 into the chamber 89 via the auxiliary strut ports 206. In the illustrated embodiment, the auxiliary struts 93 each include four auxiliary strut ports 206 disposed on an inner radial portion 208 of the upstream portion 205 (e.g., auxiliary front end) of the auxiliary strut 93. As discussed in further detail herein, the auxiliary strut ports 206 are angled relative a longitudinal axis of the auxiliary struts 93. In certain embodiments, the auxiliary struts 93 may include more or fewer than four auxiliary strut ports 206 (e.g., 1, 2, 3, 5, 6, 7, 8, 9, 10, or more). Although the illustrated embodiment shows each auxiliary strut 93 as having the same number of auxiliary strut ports 206, the number of auxiliary strut ports 206 may vary between the auxiliary struts 93.

It should be recognized that though the illustrated embodiment shows the inner ports 134, the outer ports 134, and the strut ports 146 as being uniformly spaced, in certain embodiments they may be non-uniformly spaced. Additionally, or alternatively, in certain embodiments, the fluid injection system 38 may include more or fewer inner ports 134, outer ports 134, and/or strut ports 146 than shown in the illustrated embodiment.

Figure 5:
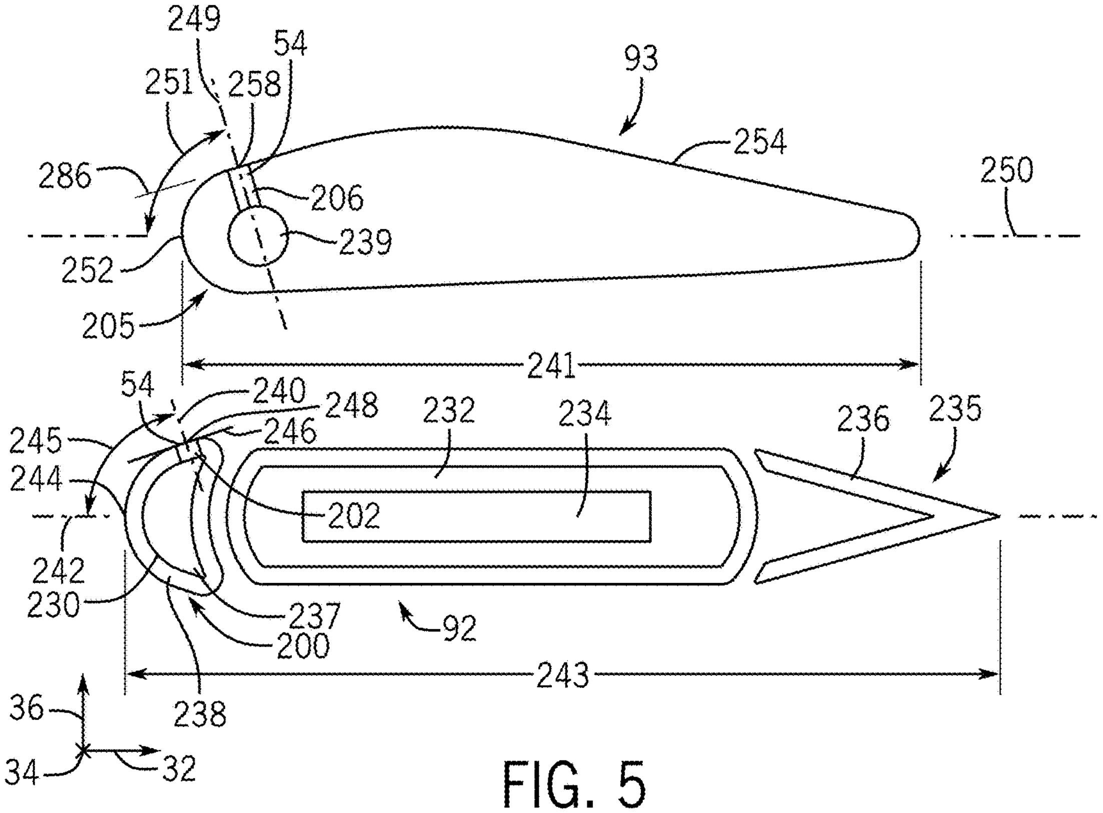
FIG. 5 is a cross-sectional view of an embodiment of a strut and an auxiliary strut of FIG. 3 taken along line 5-5 of FIG. 4, showing fluid injection ports disposed in a front end portion of the strut and a front end portion of the auxiliary strut.

FIG. 5 is a cross-sectional view of an embodiment of the main strut 92 and the auxiliary strut 93 of FIG. 3 taken along line 5-5, showing fluid injection ports 54 disposed in the upstream portion 200 of the main strut 92 and the upstream portion 205 of the auxiliary strut 93. In the illustrated embodiment, the main strut 92 includes a nose portion 230 of the upstream portion 200, a central portion 232, a central support 234 disposed in the central portion 232, and a tail portion 236 of a downstream portion 235. As shown, the nose portion 230 of the upstream portion 200 includes one or more main strut ports 202 disposed in a nose wall 238 of the nose portion 230, wherein the main strut ports 202 are fluidly coupled to a fluid channel 237 (e.g., radial fluid passage) in the nose portion 230. In the illustrated embodiment, the auxiliary strut 93 includes a fluid channel 239

(e.g., radial fluid passage) disposed in the upstream portion 205 of the auxiliary strut 93. The fluid channel 239 may be configured to transfer the fluid 73 in the radial direction 34 to the auxiliary strut ports 206.

In the illustrated embodiment, an auxiliary longitudinal length 241 (e.g., axial length) of the auxiliary strut 93 is shorter than a longitudinal length 243 (e.g., axial length) of the main strut 92 in the axial direction 32. For example, the auxiliary longitudinal length 241 may be greater than or equal to 30, 35, 40, 45, 50, 55, 60, 65, 70, 75, or 80 percent of the longitudinal length 243. In certain embodiments, the auxiliary longitudinal length 241 may be substantially equivalent to the longitudinal length 243.

In the illustrated embodiment, a longitudinal central axis 242 extends through the main strut 92 from a leading edge 244 to a trailing edge of the tail portion 236. The longitudinal central axis 242 intersects the leading edge 244 at a center upstream edge or first intersection. Each main strut port 202 includes a central axis 240 that is angled relative to the longitudinal central axis 242 of the main strut 92. In certain embodiments, an angle 245 between the central axis 240 and the longitudinal central axis 242 may vary from 0 to 80 degrees. For example, the angle 245 may be less than or equal to 5, 10, 15, 20, 25, 30, 35, 40, 45, 50, 55, 60, 65, 70, 75, or 80 degrees. In the illustrated embodiment, the central axis 240 is offset from the longitudinal central axis 242 at the leading edge 244 of the nose portion 230 of the main strut 92. In the illustrated embodiment, the central axis 240 is substantially perpendicular to a tangent 246 of the nose wall 238 at a second intersection 248 of the central axis 240 and the nose wall 238 (that is, the main strut port 202 is normal to the surface of the nose wall 238 at the location of the main strut port 202). In certain embodiments, the central axis 240 may not be perpendicular to the tangent 246 (that is, the main strut port 202 may be oriented at an angle other than 90 degrees relative to the surface of the nose wall 238).

In the illustrated embodiment, an auxiliary longitudinal central axis 250 extends through the auxiliary strut 93 from a leading edge 252 to a trailing edge opposite the leading edge. The longitudinal central axis 250 intersects the leading edge 252 at a center upstream edge or first intersection. Each auxiliary strut port 206 includes an auxiliary central axis 249 that is angled relative to the auxiliary longitudinal central axis 250 of the auxiliary strut 93. As shown, the auxiliary longitudinal central axis 250 is substantially parallel to the longitudinal central axis 242. In certain embodiments, an angle 251 between the auxiliary central axis 249 and the auxiliary longitudinal central axis 250 may vary from 0 to 80 degrees. For example, the angle 245 may be less than or equal to 5, 10, 15, 20, 25, 30, 35, 40, 45, 50, 55, 60, 65, 70, 75, or 80 degrees. In the illustrated embodiment, the auxiliary central axis 249 is offset from the auxiliary longitudinal central axis 250 at the leading edge 252 of the auxiliary strut 93. In the illustrated embodiment, the auxiliary central axis 249 is substantially perpendicular to a tangent 286 of the outer surface 254 at a second intersection 258 of the auxiliary central axis 248 and the outer surface 254 (that is, the auxiliary strut port 206 is normal to the surface of the upstream portion 205 at the location of the auxiliary strut port 206). In certain embodiments, the auxiliary central axis 249 may not be perpendicular to the tangent 256 (that is, the auxiliary strut port 206 may be oriented at an angle other than 90 degrees relative to the surface of the upstream portion 205).

In certain embodiments, the controller 56 may independently control flows to the main strut ports 202 and the auxiliary strut ports 206. That is, the main strut ports 202 and the auxiliary strut ports 206 may be controlled to inject the fluid concurrently or at different times depending on operating conditions and sensor feedback indicative of a need to reduce a reversed flow and/or stall conditions. In certain embodiments, where flow is introduced through the inner exhaust wall 86 or the outer exhaust wall 88, the main strut ports 202, the auxiliary strut ports 206, or both may be omitted. For example, in some embodiments, the exhaust section 24 may include both the main strut 92 and the auxiliary strut 93, and although the main strut 92 may not include the main strut ports 202, the auxiliary strut 93 may include the auxiliary strut ports 206.

Figure 6:
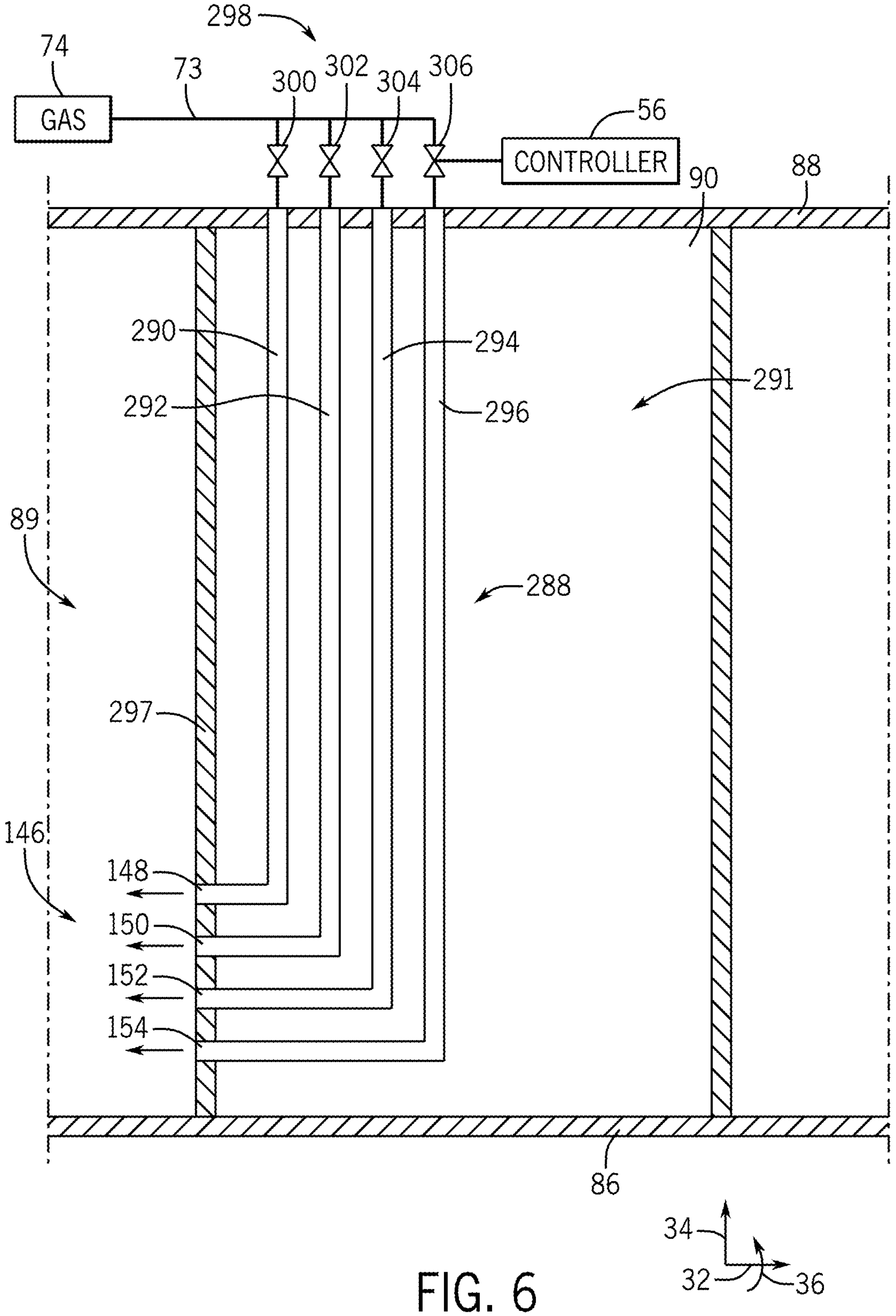
FIG. 6 is a cross-sectional view of an embodiment of the strut of FIG. 4 taken along line 6-6 of FIG. 4, showing independent control of fluid admission via each fluid injection port.

FIG. 6 is a cross-sectional view of an embodiment of the strut 90 (e.g., main strut 92, auxiliary strut 93) of FIG. 4 taken along line 6-6, showing independent control of fluid admission via each fluid injection port. In the illustrated embodiment, the strut 90 includes strut ports 146 (e.g., main strut ports, auxiliary strut ports). The strut ports 146 are each fluidly coupled to separate fluid channels 288 (e.g., fluid channels 290, 292, 294, and 296). The fluid channels 288 are disposed in an interior 291 of the strut 90. In the illustrated embodiment, the fluid channels 288 extend from a front wall 297 (e.g., nose wall) of the strut 90 to the outer wall 88 (e.g., outer exhaust wall) of the gas turbine engine 12. In certain embodiments, the fluid channels 288 may extend from the front wall 297 to the inner wall 86 of the gas turbine engine 12.

In the illustrated embodiment, each of the fluid channels 288 is coupled to a valve 298 (e.g., valves 300, 302, 304, and 306). As shown, the valves 298 (e.g., valves 72, FIG. 2) are fluidly coupled to a fluid source 74 and communicatively coupled to the controller 56, which is configured to independently control each of the valves 298 (for simplicity, only the coupling between the controller 56 and the valve 306 is shown). In certain embodiments, the controller 56 may be configured to set different flow rates for each of the valves 298. For example, the controller 56 may control the valve 306 so that the fluid 73 travels through the fluid channel 296 and is admitted to the chamber 89 via the strut port 154 at a high flow rate. The controller 56 may be configured to vary the flow rate of the fluid 73 from one strut port 146 to another. That is, the controller 56 may control the valves 298 such that the flow rate at which the fluid 73 is injected into the chamber 89 decreases from the strut port 154 to the strut port 148 (that is, a decrease in the radially outward direction). In certain embodiments, the controller 56 may control the valves 298 such that the flow rate at which the fluid 73 is injected into the chamber 89 increases from the strut port 154 to the strut port 148 (that is, an increase in the radially outward direction). As illustrated, each of the strut ports 146 (e.g., strut ports 148, 150, 152, and 154) is disposed at a different radial distance from the inner wall 86. In operation, the controller 56 is configured to selectively control the valves 298 (e.g., valves 300, 302, 304, and 306) to adjust the fluid flow at the different radial distances via the different strut ports 146.

In the illustrated embodiment, each strut port 146 is fluidly coupled to a separate fluid channel 288. In certain embodiments, a fluid channel 288 may be fluidly coupled to more than one strut port 146. For example, one fluid channel 288 may be fluidly coupled to the strut ports 148 and 150, and another fluid channel 288 may be fluidly coupled to the strut ports 152 and 154. In certain embodiments, each strut port 146 may be fluidly coupled to the same fluid channel 288. It should be recognized that while the illustrated embodiment shows four strut ports 146, four fluid channels 288, and four valves 298, the main strut 92 may include more or fewer strut ports 146, fluid channels 288, and/or valves 298 (e.g., 1, 2, 3, 4, 5, 6, 7, 8, 9, 10, or more). The embodiments described herein regarding the independent control of the strut ports 146 may apply to the main strut, the auxiliary strut, or both.

Figure 7:
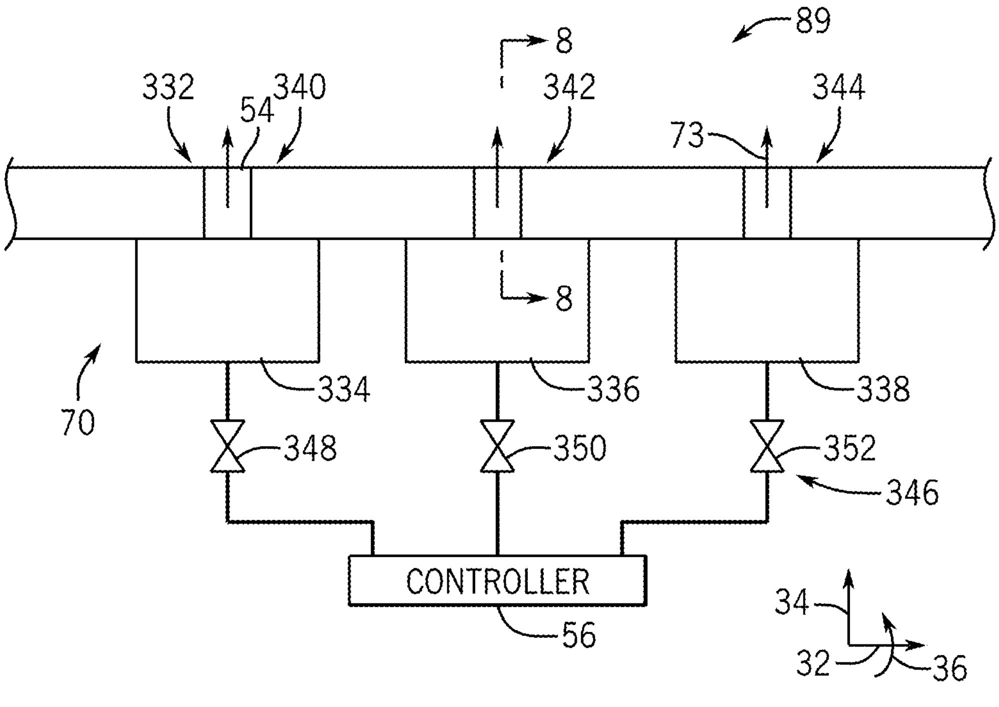
FIG. 7 is a cross-sectional view of an embodiment of the fluid injection ports of FIG. 4 taken along line 7-7 of FIG. 4, showing a fluid manifold fluidly coupled to each row of fluid injection ports.

FIG. 7 is a cross-sectional view of an embodiment of the fluid injection ports 54 in the inner wall 86 or the outer wall 88, as taken along line 7-7 of FIG. 4, showing the manifold 70 (e.g., annular manifold, fluid manifold) fluidly coupled to each set or row 332 of fluid injection ports 54 (e.g., circumferential arrangement of ports at a particular axial position). In the illustrated embodiment, each of the manifolds 70 (e.g., fluid manifolds 334, 336, and 338) are fluidly coupled to separate sets or rows 332 (e.g., rows 340, 342, and 344) of fluid injection ports 54. In the illustrated embodiment, each row 332 of fluid injection ports 54 extends in the circumferential direction 36 about a central rotational axis of the gas turbine engine 12. As shown, the rows 332 are axially spaced apart from each other in the longitudinal direction 32 of the gas turbine engine 12. Each manifold 70 is fluidly coupled to each fluid injection port 54 belonging to a certain row 332. For example, the fluid manifold 334 may be fluidly coupled to the row 340, the fluid manifold 336 may be coupled to the row 342, and the fluid manifold 338 may be coupled to the row 344.

In the illustrated embodiment, each row 332 is fluidly coupled to a separate row valve 346 (e.g., row valves 348, 350, and 352). The row valves 346 are communicatively coupled to the controller 56. The controller 56 is configured to independently control injection of the fluid 73 into the chamber 89 through each row 332 of fluid injection ports 54. The controller 56 may be configured to vary (e.g., increase or decrease) the flow rate of the fluid 73 from one row 332 to another. That is, the controller 56 may control the row valves 346 such that the flow rate at which the fluid 73 is injected into the chamber 89 decreases from the row 340 to the row 344. In certain embodiments, the controller 56 may control the row valves 346 such that the flow rate at which the fluid 73 is injected into the chamber 89 increases from the row 340 to the row 344. The fluid injection ports 54 in the illustrated embodiment may include the inner ports 134, the outer ports 136, or both.

Figure 8:
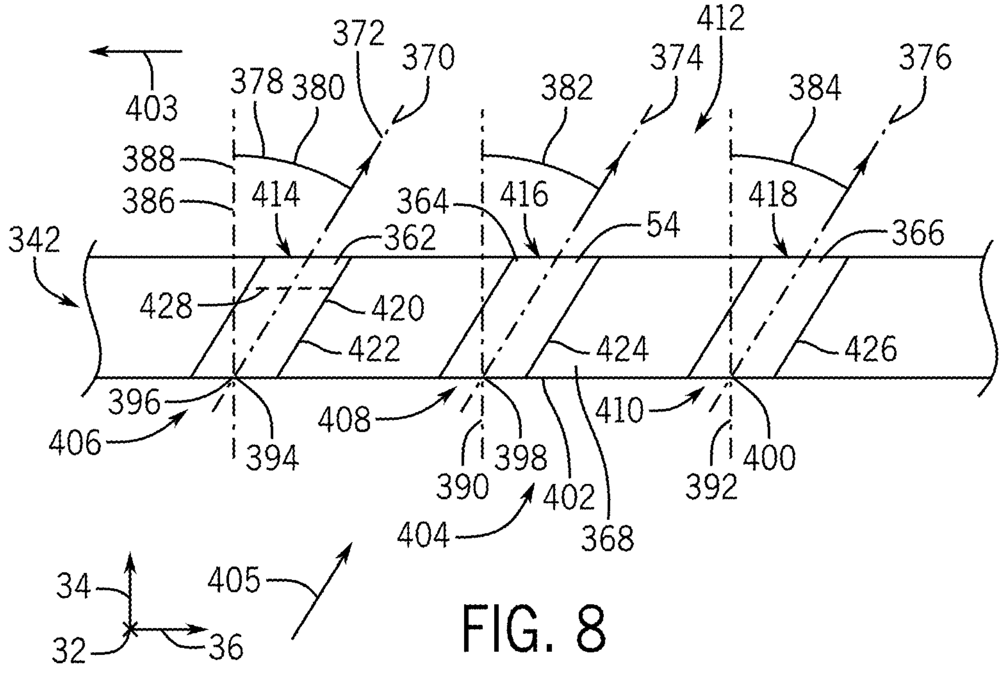
FIG. 8 is a cross-sectional view of an embodiment of a row of fluid injection ports of FIG. 7 taken along line 8-8 of FIG. 7, showing a circumferential angling of each fluid injection port.

FIG. 8 is a cross-sectional view of an embodiment of a row 342 of fluid injection ports 54 of FIG. 7, as taken along line 8-8, showing a circumferential angling of each fluid injection port 54 in the circumferential direction 36. In the illustrated embodiment, the fluid injection ports 54 (e.g., fluid injection ports 362, 364, and 366) are disposed in a wall 368 (e.g., inner wall 86, outer wall 88). As shown, port central axes 370 (e.g., port central axes 372, 374, and 376) of the fluid injection ports 54 make angles 378 (e.g., angles 380, 382, and 384) with radial axes 386 (e.g., radial axes 388, 390, and 392) extending from central rotational axis of the gas turbine engine 12 to intersections 394 (e.g., intersections 396, 398, and 400) of the radial axes 386, the port central axes 370, and a surface 402 (e.g., inner surface, outer surface) of the wall 368. In certain embodiments, the fluid injection ports 54 are angled in the opposite direction in which the turbine blades spin (e.g., direction of rotating stall). For example, if the turbine blades spin in the circumferential direction 36 as indicated by arrow 403, then the fluid injection ports 54 may be angled in the circumferential direction 36 opposite to the arrow 403, causing the fluid 73 to be directed in an angled direction 405 having a circumferential component. The fluid admission ports 54 may be angled in the circumferential direction 36 in a clockwise or counterclockwise orientation. In certain embodiments, the angles 378 may range from 0 to 80 degrees. For example, the angles 378 may be less than, equal to, or greater than 5, 10, 15, 20, 25, 30, 35, 40, 45, 50, 55, 60, 65, 70, 75, or 80 degrees.

In the illustrated embodiment, each fluid injection port 54 includes inlets 404 (e.g., inlet 406, 408, and 410) and outlets 412 (e.g., outlets 414, 416, and 418). As shown, the angling of the port central axes 370 results in the outlets 412 being circumferentially shifted relative to the inlets 404. In the illustrated embodiment, the fluid injection ports 54 include side surfaces 420 (e.g., side surfaces 422, 424, and 426). The side surfaces may have a uniform cross section 428 extending from the inlets 404 to the outlets 412. For example, the cross section 428 may be circular, elliptical, square, rectangular, etc. In the illustrated embodiment, the cross section 428 is shown as being translated linearly along the port central axes 370 from the inlets 404 to the outlets 412 to form the fluid injection ports 54. In certain embodiments, the fluid injection ports 54 may be curved. That is, the cross section 428 may be translated along a curved line extending from the inlet 404 to the outlet 412.

Figure 9:
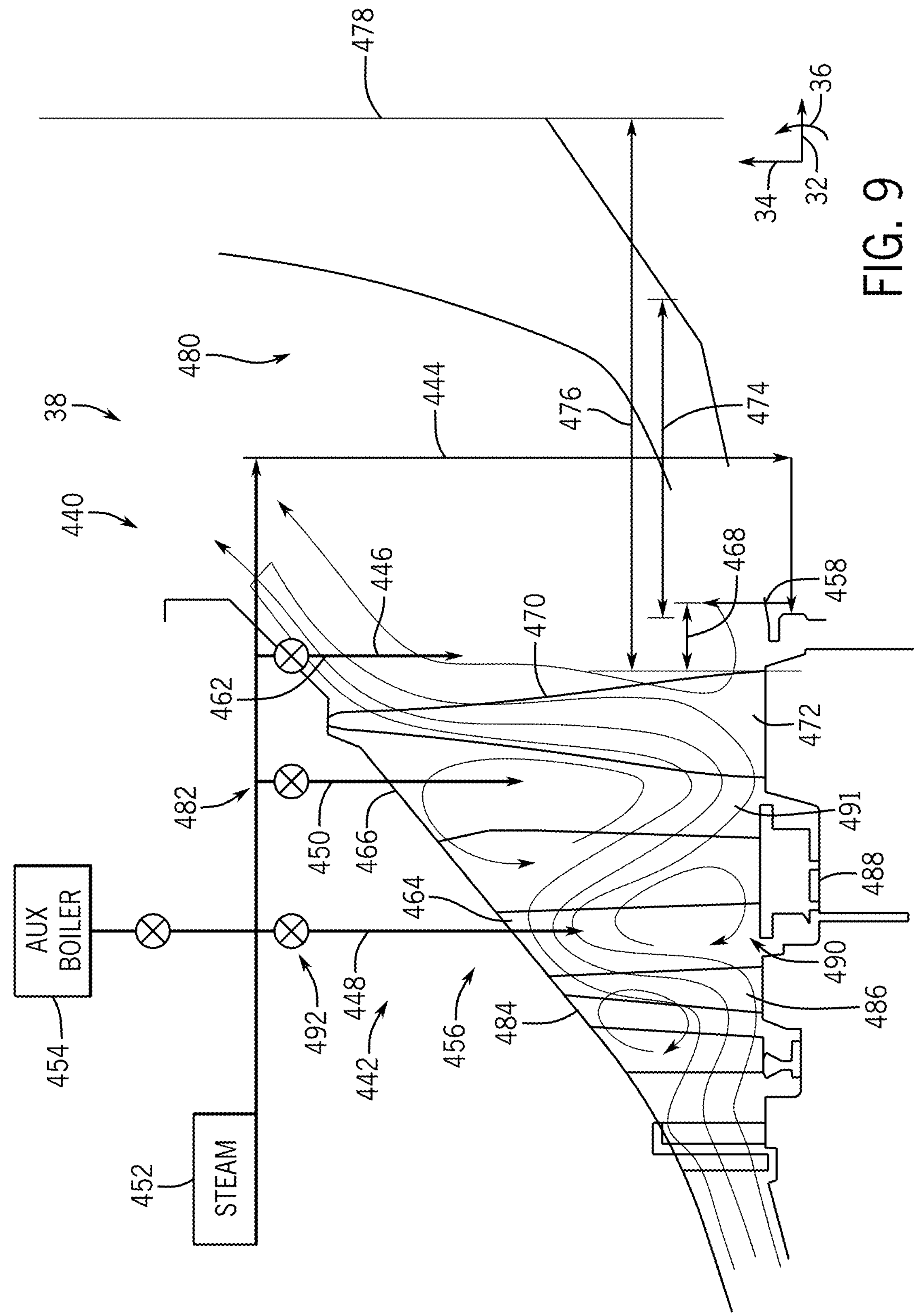
FIG. 9 is a cross-sectional side view of an embodiment of a steam turbine engine sectioned through the longitudinal axis, illustrating exemplary fluid flows generated by an embodiment of the fluid injection system.

FIG. 9 is a cross-sectional side view of an embodiment of a steam turbine engine 440 sectioned through the longitudinal axis 32, illustrating an embodiment of the fluid injection system 38. In the illustrated embodiment, the fluid injection system 38 includes fluid lines 442 (e.g., fluid admission lines 446, 448, and 450) fluidly coupled to a steam source 452 and an external auxiliary boiler 454. Although the illustrated embodiment shows the steam source 452 and the external auxiliary boiler 454, a combination of one or more fluid sources described herein may be used. The fluid lines 442 are fluidly coupled to the fluid injection ports 456. The fluid injection ports 456 include inner ports 458 and outer ports 460 (e.g., outer ports 462, 464, and 466).

In the illustrated embodiment, the inner ports 458 are disposed a distance 468 downstream of a downstream edge 470 of a last stage blade 472. As shown, the distance 468 falls in a range of distances 474 ranging from one fourth to one half of a width 476 spanning the downstream edge 470 of the last stage blade 472 and a back wall 478 of the steam turbine engine 440. In certain embodiments, the inner ports 458 may include one or more axial rows of ports (e.g., annular row of ports). It should be recognized that the admission of the fluid 73 via the inner ports 458 mitigates the formation of rotating stalls (e.g., hub vortex stalls) in a chamber 480 downstream of a turbine 482 of the steam turbine engine 440.

In the illustrated embodiment, the fluid admission line 446 is fluidly coupled to outer ports 462. As shown, the outer ports 462 are integrally disposed in an outer wall 484 and disposed downstream of the downstream edge 470 of the last stage blade 472. The outer ports 462 may include one or more axial rows of ports (e.g., annular row of ports). The outer ports 462 are configured to admit the fluid 73 into the chamber 480 from the outer wall 484. It should be recognized that the admission of the fluid 73 via the outer ports 462 mitigates the formation of rotating stalls (e.g., hub vortex stalls) in the chamber 480 downstream of the turbine 482.

In the illustrated embodiment, the fluid lines 448 and 450 are fluidly coupled to the outer ports 464 and 466, respectively. As shown, the outer port 464 is integrally disposed in the outer wall 484 and axially disposed between second-to-last (penultimate) stage blades 486 of the turbine 482 and last (ultimate) stage vanes 488 of the turbine 482. The outer port 464 is configured to admit fluid 73 into a second-to-last torus chamber 490 axially disposed between the second-to-last stage blades 486 of the turbine 482 and the last stage vanes 488. Additionally, the outer port 466 is integrally disposed in the outer wall 484 and axially disposed between the last stage vanes 488 and the last stage blades 472 of the turbine 482. The outer port 466 is configured to admit fluid 73 into a last torus chamber 491 axially disposed between the last stage vanes 488 and the last stage blades 472 of the turbine 482.

In the illustrated embodiment, each of the outer ports 460 are shown as being independently controllable via valves 492 coupled to the controller 56, such that any combination of the outer ports 462, 464, and 466 may admit fluid into the turbine 482 and/or the chamber 480. The admission of the fluid 73 via the outer ports 462, 464, and 466 mitigates the formation of rotating stalls (e.g., torus vortex stalls) in torus chambers 490 and 491 (e.g., turbine chambers) and the chamber 480. Furthermore, the outer ports 460 may include any combination of the outer ports 462, 464, and 466. Although the outer ports 462, 464, 466 may be referred to herein in the singular, it should be understood that a plurality of circumferentially arranged outer ports 462, 464, 466 may be used.

Figure 10:
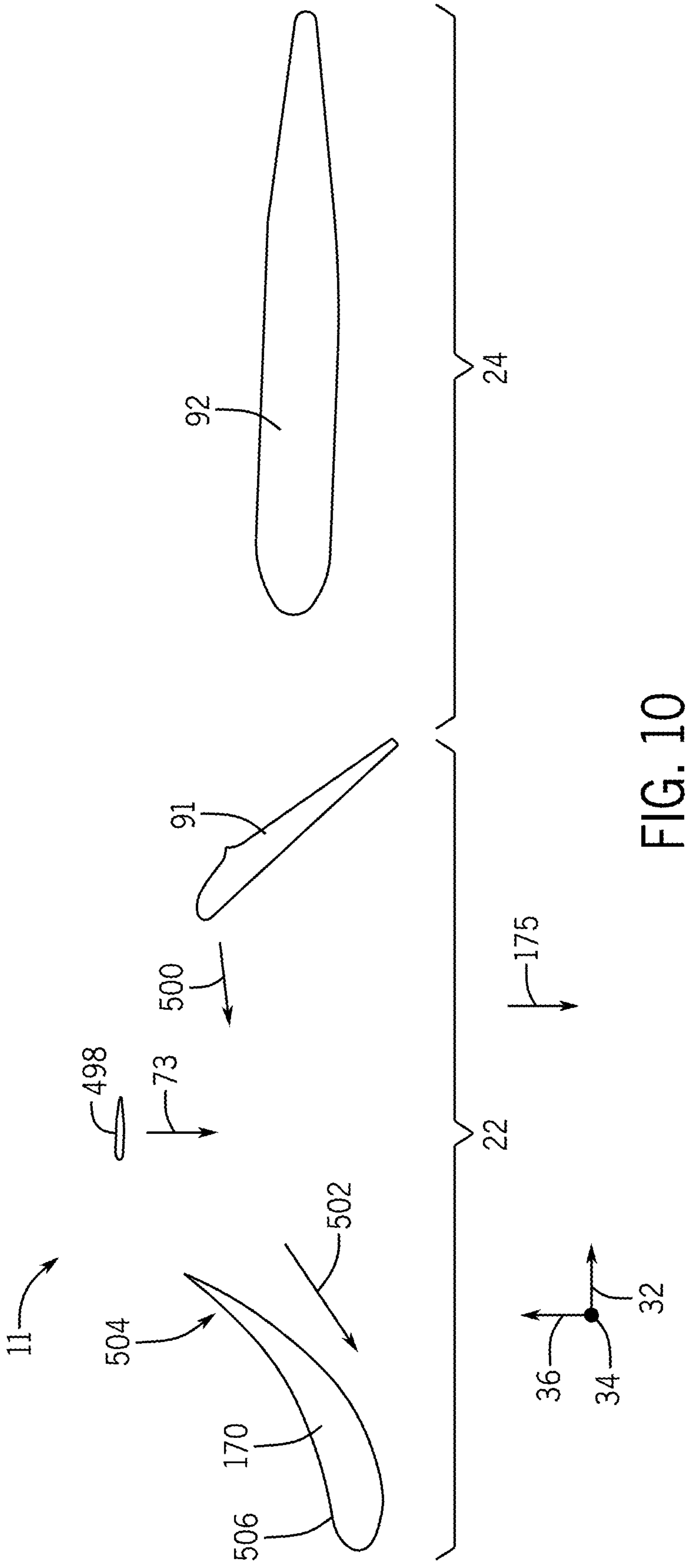
FIG. 10 is a cross-sectional schematic view of an embodiment of the stall mitigation system of FIG. 2, taken along line 10-10 of FIG. 3.

FIG. 10 is a cross-sectional schematic view of an embodiment of the stall mitigation system of FIG. 2, taken along line 10-10 of FIG. 3. In the illustrated embodiment, the cutting plane of the cross-section is orthogonal to the radial direction 34 and intersects the last stage vane 170 of the turbine 22, the last stage blade 91 of the turbine 22, and the main strut 92 of the exhaust section 24. As shown, a fluid 73 is injected (e.g., admitted) through one or more fluid injection ports 136 (e.g., outer ports 144 referenced in FIG. 3) positioned downstream of an axial position of the last stage vane 170 and upstream of an axial position of the last stage blade 91, such that the fluid 73 is injected axially between the last stage vane 170 and the last stage blade 91. Additionally, one or more fluid injection ports 498 are configured to inject the fluid 73 in the circumferential direction 175 (e.g., opposite the direction of blade rotation of the last stage blade 91). In certain embodiments, the one or more fluid injection ports 498 may include the fluid injection ports 136, 144 of FIG. 3. The injected fluid 73 is imparted on a reverse flow 500 of the exhaust gas, thereby causing the reverse flow 500 to deflect in the direction 175. The deflected reverse flow 502 more closely aligns with a trailing portion 504 of the last stage vane 170. The injection of the fluid 73 in the direction 175 causes the deflected reverse flow 502 to more closely align with an outer contour 506 of the last stage vane 170, thereby mitigating turbulence that may otherwise result from the reverse flow 121 (e.g., undeflected) contacting the last stage vane 170 with greater orthogonality.

As discussed herein, the injection of the fluid 73 via outer ports 144 between the last stage vane 170 and the last stage blade 91 may mitigate the formation of a torus vortex between the last stage vane 170 and the last stage blade 91. Any number of outer ports 498 may be disposed between the last stage vane 170 and the last stage blade 91. For example, 2, 3, 4, 5, 6, 7, 9, 15, 20, 30, 50, 100, or more outer ports 498 may be disposed between the last stage vane 170 and the last stage blade 91. As with the inner ports, the outer ports 498 may be axially aligned in the turbine 22. In certain embodiments, in reference to FIG. 3, the outer ports 498 may be disposed longitudinally (e.g., axially) as outer ports 142 between the second-to-last stage blade 168 and the last stage vane 170, as outer ports 140 between the second-to-last stage vane 166 and the second-to-last stage blade 168, or as outer ports between any suitable blade and vane of the turbine 22. As shown in FIG. 3, the turbine 22 may also include one or more inner ports 134 disposed longitudinally (e.g., axially) between the last stage vane 170 and the last stage blade 91 of the turbine 22 for injecting the fluid 73 between the last stage vane 170 and the last stage blade 91. In certain embodiments, the one or more inner ports 134 may be in the same axial position as the outer ports 136.

Technical effects of the disclosed embodiments include the ability to mitigate the formation of rotating stall cells in a turbine section, such as an exhaust section of a gas turbine engine or a steam turbine. In particular, the disclosed embodiments interrupt the forward and/or reverse flow of the exhaust gas, thereby reducing the velocity gradient of the shear layer disposed directly downstream of the last stage blade of the respective turbine. For example, in one embodiment, inner fluid injection ports disposed on an inner wall of an exhaust section of the turbine are configured to inject a fluid into the path of the reverse flow of the exhaust gas, thereby reducing the velocity of the reverse flow prior to it reaching the last stage blades. Additionally, strut fluid injection ports disposed in an upstream portion of main diffuser struts and/or auxiliary diffuser struts inject the fluid into the path of the exhaust gas as it changes from a forward flow to a reverse flow due to being blocked by the struts. As with the inner fluid injection ports, the strut fluid injection ports reduce the velocity of the reverse flow prior to it reaching the last stage blades, thereby reducing the velocity gradient of the shear layer.

The subject matter described in detail above may be defined by one or more clauses, as set forth below.

A system includes a turbine exhaust section downstream of a turbine. The turbine exhaust section includes an exhaust flow path. The turbine exhaust section also includes an inner wall radially disposed along the exhaust flow path. The turbine exhaust section also includes an outer wall disposed radially outward of the inner wall and along the exhaust flow path. The system also includes a fluid injection system configured to inject a fluid into a chamber radially disposed between the inner wall and the outer wall via a plurality of inner ports disposed in the inner wall. The plurality of inner ports is disposed downstream of a downstream edge of a last stage blade of the turbine.

The system of the preceding clause, wherein the plurality of inner ports is disposed a distance downstream from the downstream edge of the last stage blade of the turbine, wherein the distance is between 25 percent and 50 percent of a width spanning from the downstream edge of the last stage blade to an upstream edge of a strut of the turbine exhaust section.

The system of any preceding clause, wherein the fluid injection system is configured to inject the fluid into the chamber via a plurality of first outer ports disposed in the outer wall.

The system of any preceding clause, wherein the fluid injection system is configured to inject the fluid into a turbine chamber radially disposed between the inner wall and the outer wall and axially disposed between a vane and a blade of the turbine via a plurality of second outer ports integrally disposed in the outer wall.

The system of any preceding clause, wherein a central axis of an inner port of the plurality of inner ports is circumferentially angled with respect to a radial axis extending from a longitudinal central axis of the turbine exhaust section to the central axis of the inner port.

The system of any preceding clause, wherein the fluid injection system includes an ejector fluidly coupled to one or more fluid ports in the outer wall, wherein the ejector is configured to suction an exhaust gas from the chamber.

The system of any preceding clause, wherein the fluid includes a bleed gas from a compressor of the turbine, an external gas, an inert gas, or a combination thereof.

A system includes a turbine exhaust section. The turbine exhaust section includes an exhaust flow path, an inner wall radially disposed along the exhaust flow path, and an outer wall disposed radially outward of the inner wall and along the exhaust flow path, and a strut radially extending from the inner wall to the outer wall. The system also includes a fluid injection system configured to inject a fluid into a chamber radially disposed between the inner wall and the outer wall via a plurality of ports disposed in a front end portion of the strut. The plurality of ports is disposed downstream of a downstream edge of a last turbine blade of a turbine.

The system of the preceding clause, wherein the plurality of ports is disposed on an inner radial portion of the front end portion of the strut, and wherein a central axis of a port of the plurality of ports is angled relative to a longitudinal central axis of the strut.

The system of any preceding clause, including an auxiliary strut extending from the inner wall toward the outer wall, wherein the auxiliary strut is circumferentially offset from the strut.

The system of any preceding clause, wherein the fluid injection system is configured to inject the fluid into the chamber via a plurality of auxiliary ports disposed in an auxiliary front end portion of the auxiliary strut.

The system of any preceding clause, wherein the plurality of auxiliary ports is disposed on an auxiliary inner radial portion of the auxiliary front end portion of the auxiliary strut, and wherein an auxiliary central axis of an auxiliary port of the plurality of auxiliary ports is angled relative to an auxiliary longitudinal central axis of the auxiliary strut.

The system of any preceding clause, wherein a central axis of the plurality of ports is offset from a longitudinal central axis of the strut, wherein the auxiliary central axis is offset from the auxiliary longitudinal central axis, or wherein both the central axis and the auxiliary central axis are offset, respectively, from the longitudinal central axis and the auxiliary longitudinal central axis.

The system of any preceding clause, wherein the fluid injection system includes a controller configured to independently control flows to different ports of the plurality of ports to inject the fluid into the chamber, independently control flows to different auxiliary ports of the plurality of auxiliary ports to inject the fluid into the chamber, or both.

A system includes a turbine exhaust section downstream of a turbine. The turbine exhaust section includes an exhaust flow path, an inner wall radially disposed along the exhaust flow path, and an outer wall disposed radially outward of the inner wall and along the exhaust flow path. The system also includes a fluid injection system. The fluid injection system includes a fluid supply configured to supply one or more fluids to the turbine exhaust section. The fluid injection system also includes a controller having a processor, a memory, and instructions stored on the memory and executable by the processor to control injection of the one or more fluids into a chamber radially disposed between the inner wall and the outer wall via a plurality of inner ports integrally formed in the inner wall. The plurality of inner ports is disposed downstream of a downstream edge of a last stage blade of the turbine.

The system of the preceding clause, wherein the fluid injection system is configured to inject the one or more fluids into the chamber via a plurality of first outer ports disposed in the outer wall.

The system of any preceding clause, wherein the fluid injection system is configured to inject the one or more fluids radially between the inner wall and the outer wall and axially between a vane and a blade of the turbine via a plurality of second outer ports integrally disposed in the outer wall.

The system of any preceding clause, wherein the plurality of inner ports, the plurality of first outer ports, the plurality of second outer ports, or a combination thereof includes a plurality of rows of ports in circumferential arrangements at different axial positions, wherein the controller is configured to independently control injection of the one or more fluids through each row of the plurality of rows.

The system of any preceding clause, wherein the fluid injection system includes an ejector fluidly coupled to one or more fluid ports in the outer wall, wherein the ejector is configured to suction an exhaust gas from the chamber.

The system of any preceding clause, wherein the controller is configured to control injection of the one or more fluids independently via the plurality of inner ports, the plurality of first outer ports, the plurality of second outer ports, or a combination thereof, control suction of the exhaust gas from the chamber independently from the injection of the one or more fluids, or both.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:

a turbine system, comprising:

an exhaust flow path;

an inner wall radially disposed along the exhaust flow path; and an outer wall disposed radially outward of the inner wall and along the exhaust flow path; and a fluid injection system configured to inject a fluid into a chamber to reduce or inhibit a rotating stall condition of a turbine of the turbine system, wherein the chamber is disposed radially between the inner wall and the outer wall, wherein the fluid is injected via a plurality of ports disposed in the outer wall, the inner wall, or both;

wherein the plurality of ports is angled in a circumferential direction about a longitudinal central axis of the turbine, and the circumferential direction opposes a direction of rotation of a plurality of blades of the turbine.

2. The system of claim 1, wherein the plurality of ports is disposed in one or more stages of the turbine.

3. The system of claim 2, wherein the one or more stages comprises a last stage of the turbine, a second-to-last stage of the turbine, a third-to-last stage of the turbine, or a combination thereof.

4. The system of claim 3, wherein the fluid injection system is configured to selectively control injection of the fluid into the one or more stages.

5. The system of claim 1, wherein the plurality of ports is disposed downstream of a downstream edge of a last turbine blade of a last stage of the turbine.

6. The system of claim 1, wherein the plurality of ports is further disposed at least in the outer wall.

7. The system of claim 6, wherein the plurality of ports is further disposed in the inner wall.

8. The system of claim 6, wherein a central axis of a port of the plurality of ports is oriented at an acute angle with respect to a radial axis extending from the longitudinal central axis to the central axis of the port, the acute angle extends in the circumferential direction around the longitudinal central axis.

9. A system, comprising:

a turbine system, comprising:

an exhaust flow path;

an inner wall radially disposed along the exhaust flow path;

an outer wall disposed radially outward of the inner wall and along the exhaust flow path;

a strut radially extending from the inner wall to the outer wall, wherein an axial length of the strut extends from a leading edge of the strut to a trailing edge of the strut, and a plurality of ports is formed into the strut; and an auxiliary strut axially aligned with the strut and circumferentially offset from the strut, wherein an additional axial length of the auxiliary strut extends from an additional leading edge of the auxiliary strut to an additional trailing edge of the auxiliary strut, the additional axial length is less than the axial length, and a plurality of auxiliary ports is formed into the auxiliary strut; and a fluid injection system configured to inject a fluid into a chamber to reduce or inhibit a rotating stall condition of a turbine of the turbine system, wherein the chamber is radially disposed between the inner wall and the outer wall, wherein the fluid is injected via the plurality of ports;

and/or the plurality of auxiliary ports.

10. The system of claim 9, wherein the plurality of ports is disposed on a front end portion of the strut.

11. The system of claim 9, wherein the plurality of auxiliary ports is disposed on an inner radial portion of the auxiliary strut.

12. The system of claim 9, comprising a plurality of channels disposed within an interior of the strut, wherein each channel of the plurality of channels is fluidly coupled to a respective port of the plurality of ports.

13. The system of claim 12, comprising:

a plurality of valves coupled to the plurality of channels; and a controller comprising a memory and a processor, wherein the controller is configured to control the plurality of valves to independently control respective flow rates of a plurality of flows of the fluid through the plurality of channels to different ports of the plurality of ports.

14. The system of claim 13, wherein the respective flow rates of the different flows corresponding to the plurality of ports increase along an outward radial direction of the turbine.

15. The system of claim 9, wherein the plurality of ports is disposed on the strut only over a radial distance that is less than half of a total height between the inner wall and the outer wall, and the radial distance is between the inner wall and a radial height from the inner wall.

16. The system of claim 9, wherein an angle spanning from a longitudinal central axis of the strut to a central axis of each port of the plurality of ports is between 30 degrees and 80 degrees, and the plurality of ports is angled in an upstream direction.

17. A system, comprising:

a turbine system, comprising:

an exhaust flow path;

an inner wall radially disposed along the exhaust flow path;

an outer wall disposed radially outward of the inner wall and along the exhaust flow path;

a strut radially extending from the inner wall to the outer wall;

a plurality of channels disposed within an interior of the strut; and a plurality of valves coupled to the plurality of channels;

a fluid injection system configured to inject a fluid into a chamber to reduce or inhibit a rotating stall condition of a turbine of the turbine system, wherein the chamber is radially disposed between the inner wall and the outer wall, wherein the fluid is injected via a plurality of ports, and each port of the plurality of ports is fluidly coupled to a respective channel of the plurality of channels; and a controller comprising a memory and a processor, wherein the controller is configured to control the plurality of valves to independently control respective flow rates of a plurality of flows of the fluid through the plurality of channels to different ports of the plurality of ports.

18. The system of claim 17, wherein the plurality of ports is disposed on a front end portion of the strut.

19. The system of claim 17, wherein the plurality of ports is disposed on the strut only over a radial distance that is less than half of a total height between the inner wall and the outer wall, and the radial distance is between the inner wall and a radial height from the inner wall.

20. The system of claim 17, wherein the respective flow rates of the different flows corresponding to the plurality of ports increase along an outward radial direction of the turbine.

* * * * *